(12) United States Patent
Canino et al.

(10) Patent No.: US 6,798,167 B1
(45) Date of Patent: Sep. 28, 2004

(54) SPACE SAVING AUTOMOBILE BREAKDOWN APPLIANCE

(75) Inventors: Serafino S. Canino, Torrington, CT (US); Scott Gelormino, Unionville, CT (US)

(73) Assignee: ICC Innovative Concepts Corporation, Torrington, CT (US)

( * ) Notice: Subject to any disclaimer, the term of this patent is extended or adjusted under 35 U.S.C. 154(b) by 0 days.

(21) Appl. No.: 10/138,094

(22) Filed: May 2, 2002

(51) Int. Cl.[7] .................................................. H02J 7/00
(52) U.S. Cl. ....................................... 320/112; 320/107
(58) Field of Search ................................ 320/112, 107, 320/110, 111, 114, 127, 128, 137; 307/150; 429/96, 97, 98, 99, 100

(56) References Cited

U.S. PATENT DOCUMENTS

| | | | | |
|---|---|---|---|---|
| 4,893,221 A | * | 1/1990 | Friedman | 362/108 |
| 5,173,652 A | | 12/1992 | Henkel | 320/104 |
| 5,220,269 A | * | 6/1993 | Chen et al. | 320/112 |
| 5,589,292 A | | 12/1996 | Rozon | 429/170 |
| 5,635,818 A | | 6/1997 | Quintero | 320/105 |
| 5,733,674 A | * | 3/1998 | Law et al. | 429/9 |
| 5,762,029 A | * | 6/1998 | DuBois et al. | 119/796 |
| 5,793,185 A | | 8/1998 | Prelec et al. | 320/104 |
| 6,130,519 A | | 10/2000 | Whiting et al. | 320/105 |
| 6,296,367 B1 | * | 10/2001 | Parsons et al. | 362/183 |
| 6,434,032 B1 | * | 8/2002 | Romano | 363/146 |
| 6,502,949 B1 | * | 1/2003 | Horiyama et al. | 362/119 |

\* cited by examiner

*Primary Examiner*—Lawrence Luk
(74) *Attorney, Agent, or Firm*—Kirkpatrick & Lockhart; Anthony H. Handal

(57) ABSTRACT

A space saving automobile appliance, is disclosed comprising a housing with an internal volume. Within the inner volume is a rechargeable battery for receiving power from a recharging source and for storing the power from said recharging source, and for outputting power stored in the rechargeable battery. Further within the inner volume is an electrical circuit coupled to the rechargeable battery, an external device that receives power and an power supply to recharge said battery. More specifically in one embodiment of the present invention, the battery is a the cadmium, or the metal hydride type. In an alternative embodiment of the invention, the automobile appliance further comprises a light capable of motion to allow the light to be directed in a given direction. In a further embodiment of the present invention, the automobile appliance contains a strap that is adjustable in length.

24 Claims, 11 Drawing Sheets

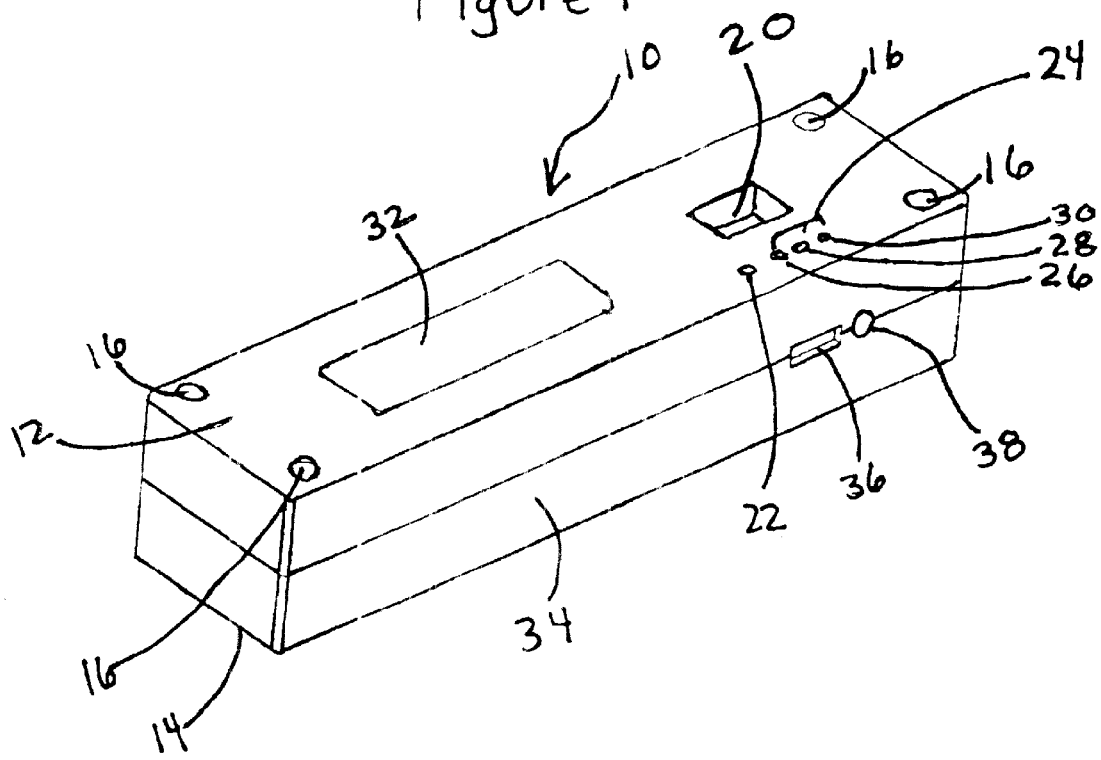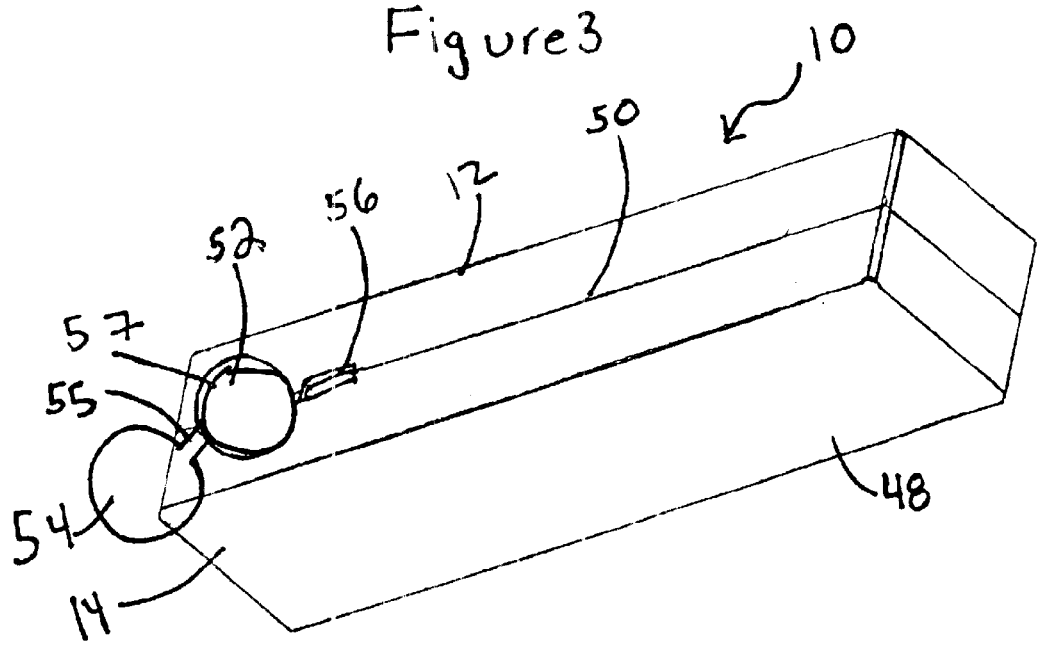

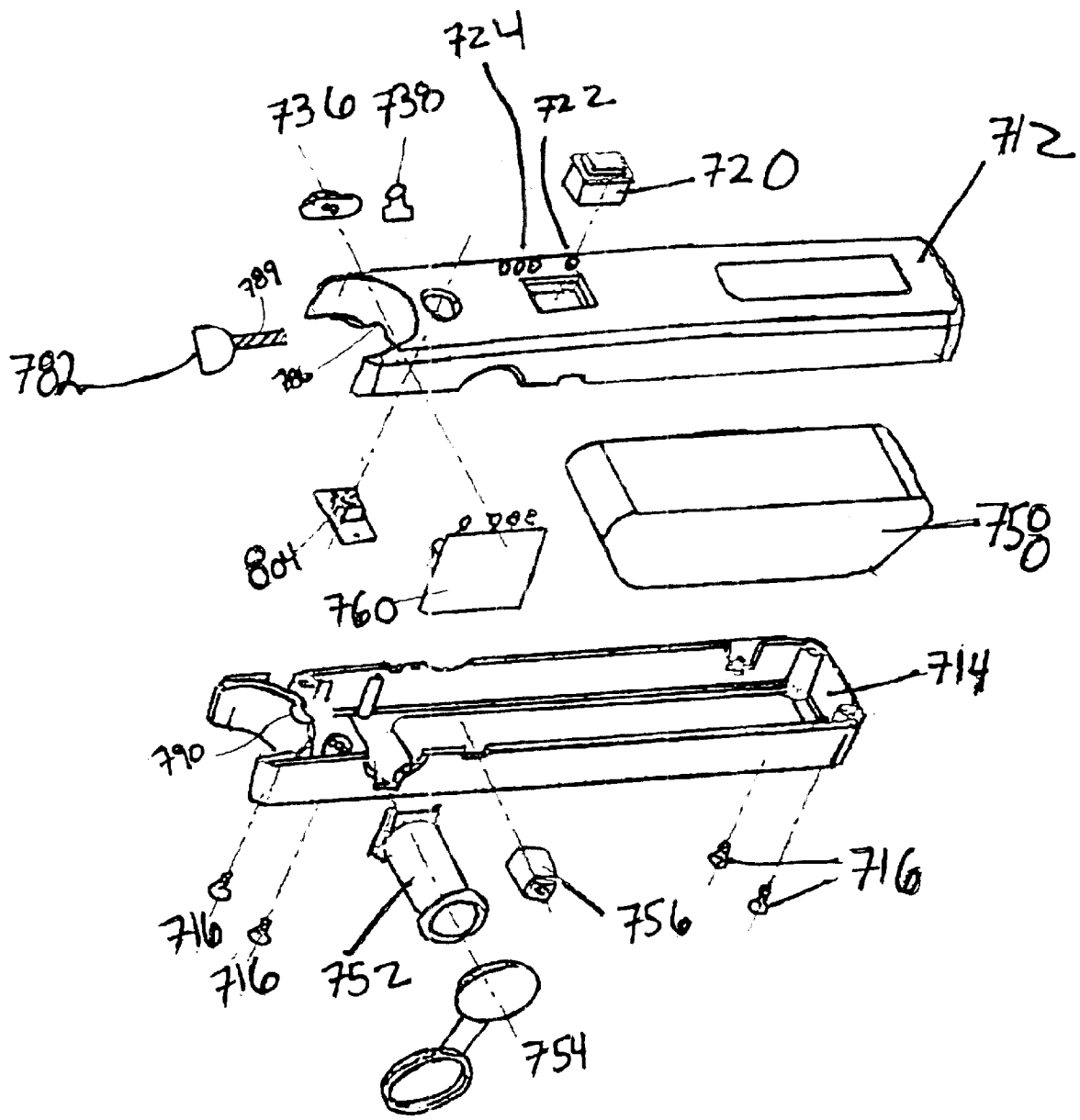

SPACE SAVING AUTOMOBILE BREAKDOWN APPLIANCE

TECHNICAL FIELD

The present invention relates to an appliance of the type which may perform multiple functions, for example during an emergency situation in an automobile, including use as a power source for starting cars with dead batteries, assisting in a repair operation and providing power to devices that run on an automobile's twelve-volt outlet.

STATEMENT REGARDING FEDERALLY SPONSORED RESEARCH OR DEVELOPMENT (Not applicable.)

BACKGROUND OF THE INVENTION

Automobile battery charging devices have been known in the art for some time. In recent years many automotive stores offer a battery device that can be kept charged to be in use in the event that a person's car battery goes dead. During use, the device is plugged into the cigarette lighter of the car, and is used to provide the power necessary to start to the engine. However, if the battery goes dead in a dark place, the car's lights cannot be used to assist in finding the device and the proper receptacles, since the car battery is dead.

Nickel Cadmium (NiCad) rechargeable batteries have been used for some time for relatively low power application.

SUMMARY OF THE INVENTION

A space saving automobile appliance comprising a housing with an internal volume is disclosed. A rechargeable battery within the inner volume receives power from a recharging source and stores the power from the recharging source, and outputs power stored in the rechargeable battery. An electrical circuit is coupled to the rechargeable battery. An external device is used to recharge the battery. More specifically in one embodiment of the present invention, the rechargeable battery is of the cadmium, or the metal hydride type. In an alternative embodiment of the invention, the automobile appliance further comprises a light capable of motion to allow the light to be directed in a given direction. In a further embodiment of the present invention, the automobile appliance contains a strap that is adjustable in length.

The rechargeable battery can be recharged using a cigarette lighter or equivalent, or with an alternating current attachment.

In addition, the appliance has a port for outputting direct current at multiple, user selected voltages to an electronic device. In the preferred embodiment of the invention, the user has the options of three-volt, six-volt or a nine-volt output.

Further, a light source mounted on the inventive appliance can be coupled to the rechargeable battery through the electrical circuit. Depending on the motion coupling mechanism used, the light may be moved in one plane, two planes or may be angularly deflectable with the use of a goose neck connection. If the light only has motion in one plane, then in the alternative embodiment that further comprises a strap, the light source housing rotates along an axis of rotation generally extending in the same direction as the strap the appliance is hanging from the shoulder of a user.

In accordance with the preferred embodiment, a switch having an "on" setting, an "off" setting and a flashing setting to turn the light on, off, and intermittently on.

In accordance with a preferred embodiment of the invention, the strap has first and second ends, the first end of the strap is secured at a first point on the housing, and the second end of the strap is secured to a second point on the housing. Because of the distance between the first and second points on the housing, when the strap is displaced by being slid along the shoulder of a user, when hanging from the shoulder of the user, this results in varying the pitch at which the inventive appliance hangs. These variations in pitch complement variations in yaw enabled by rotation of the rotatably mounted housing which houses a light mounted on the appliance.

In addition to the above, the strap may be adjusted in length whereby the position at which the appliance hangs from the shoulder of a user may be varied, whereby adjustments in pitch, yaw and point origination may be made by adjustment of the strap position, the light source housing, and the strap length, respectively, for the purpose of precisely controlling the illumination of a particular area, for example in an engine, which is being repaired by the user.

BRIEF DESCRIPTION OF THE DRAWINGS

Several embodiments of the invention and ways of making and using the invention, as well as the best mode contemplated of carrying out the invention, are described in detail below, by way of example, with reference to the accompanying drawings, in which:

FIG. 1 is a top perspective view of an embodiment according to present invention;

FIG. 3 is a bottom perspective view of the embodiment of the present invention illustrated in FIG. 1;

FIG. 18 is an exploded view of the embodiment of the present invention similar to the embodiment illustrated in FIG. 9, except the light is coupled to the housing using a gooseneck connector.

DETAILED DESCRIPTION OF THE INVENTION

Figure 4:
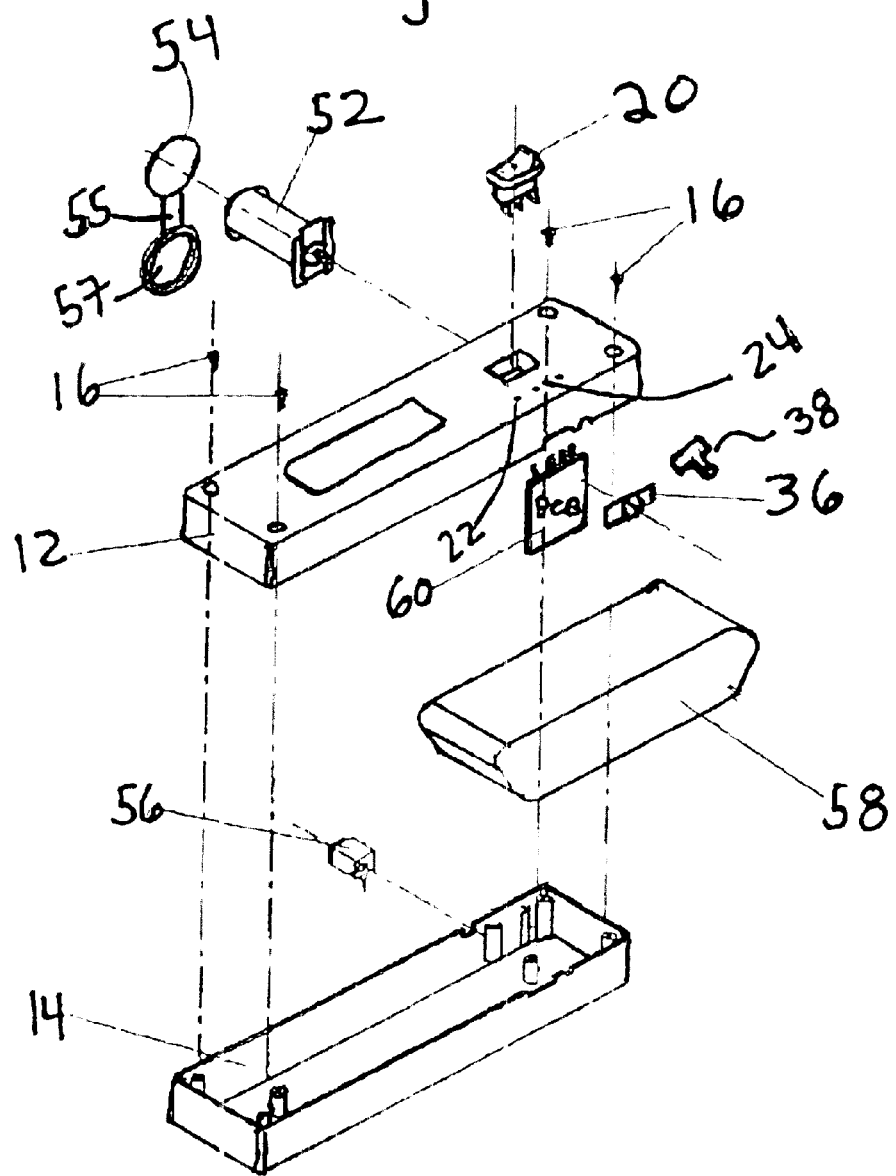
FIG. 4 is an exploded view of the embodiment of the present invention illustrated in FIG. 1.

In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

As is illustrated in FIG. 1, the inventive appliance serves as an automobile starter and direct current ("DC") appliance 10. Appliance 10 has a top housing member 12 and a bottom housing member 14, fastened together by any means common in the art, such as fasteners, clips, adhesive, welding, or, as in the preferred embodiment, by four screws 16. Appliance 10 is compact in size, with a length of 22.5 cm, a width of 5.2 cm and a height of 5.0 cm, and weighs 730 grams.

Disposed on the top surface 18 of the inventive power source is a three way switch 20, an alternating current ("AC") charging indicator 22, and a battery charge indicator 24. Switch 20 has an output position, an off position and a battery read position.

AC charging indicator 22 can be of any type of indicator common in the art, such as a sound generating device, or a visual signaling device, such as a solid or flashing light. In the preferred embodiment of the present invention, AC charging indicator is a light 22, which takes the form of a light-emitting diode or "LED". When light 22 is illuminated, it is indicating that the battery is being charged and, accordingly, the user knows that further charging is required.

It is noted that the implementation of the circuitry employed by the appliance of the present invention is of a routine nature and its design is well within the scope of what is easily implemented by an electronic designer of ordinary skill in the art.

Battery charge indicator 24 can be any type of indicator common in the art, such as a sound generating device or visual signaling device. In the preferred embodiment of the present invention, battery charge indicator 24 is made up of three LED's, one labeled empty 26, one labeled half charge 28 and one labeled full charge 30. Indicators 26–30 can be of the same colors or of different colors. In the preferred embodiment, empty indicator 26 is lit red when the voltage in the battery drops below 12.2 volts, half-charged indicator 28 is illuminated yellow when the voltage in the battery is between 12.3 and 13.4 volts and the full indicator glows green when the battery has a charge of 13.5 volts.

Figure 2:
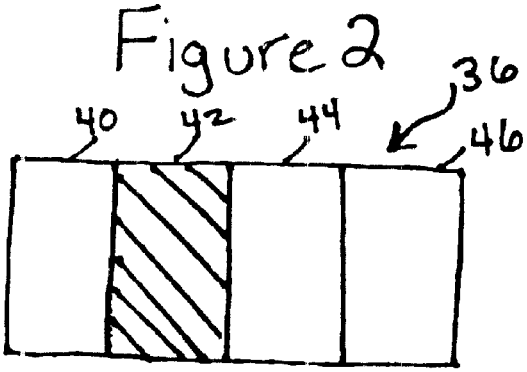
FIG. 2 is a magnified view of a DC output power switch to be used in accordance of the embodiment of the present invention illustrated in FIG. 1.

Top surface 18 can optionally have a label 32 affixed to it. Front surface 34, which is made up of a portion of top housing member 12 and bottom housing member 14, has a DC output switch 36 and a DC output connector 38. DC output switch 36 is a four position switch with positions labeled, off position 40, three-volt position 42, six- volt position 44, and nine-volt position 46, as is illustrated in FIG. 2. Referring to FIG. 3, bottom surface 48 of bottom housing member 14 can optionally have a label affixed to it.

Rear surface 50, which is made up of a portion of top housing member 12 and bottom housing member 14, supports a twelve-volt DC outlet 52 with an optional cover 54, mounted on a plastic living hinge 55 which connects it to a support 57 which is secured to the body of the housing (FIG. 4) and an electrical connector 56 used to couple the input of appliance 10 to an AC charger.

As is illustrated in FIG. 4, top housing member 12 and bottom housing member 14 houses all of the parts mentioned above, and in addition houses a rechargeable battery 58, and a printed circuit board 60. Printed circuit board 60 controls all of the electronic functions of the appliance 10 as will be described in detail below.

In the preferred embodiment, battery 58 is a nickel cadmium ("NiCad") type, twelve volt, 1.5 ampere-hour battery. In an alternative embodiment of the present invention, battery 58 can be a metal hydride battery.

AC charge indicator 22 and battery charge indicator 24 are disposed on the top of circuit board 60.

AC charge indicator 22 is electrically attached to circuit board 60. Circuit board 60 is, in turn, electrically connected to battery 58. Circuit board 60 contains circuitry to cause AC charge indicator 22 to indicate that battery 58 is receiving a normal charge from an AC charger connected to electrical connector 56, which is coupled to circuit board 60. Circuit board 60 is electrically connected to battery charge indicators 24 and three-way switch 20. Circuit board 60 has electronic circuitry to cause the applicable one of battery charge indicators 24 to indicate whether battery 58 substantially has no charge, a half charge, or a full charge.

Figure 5:
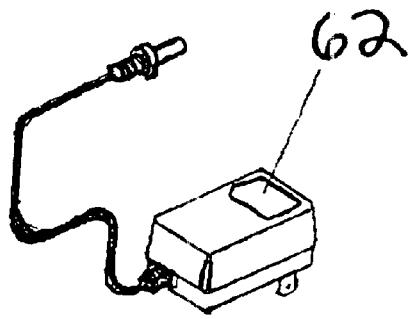
FIG. 5 is a top view of the AC power connector to be used in accordance of the embodiment of the present invention illustrated in FIG. 1.

Battery 58 is electrically connected to AC charger connector 56 (FIG. 5). An AC charger 62 can be connected to electrical connector 56.

Figure 6:
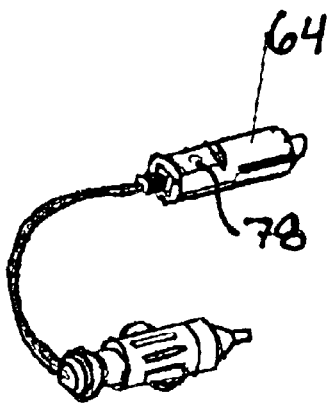
FIG. 6 is a top view of the male to male twelve-volt connector to be used in accordance of the embodiment of the present invention illustrated in FIG. 1.
Figure 7:
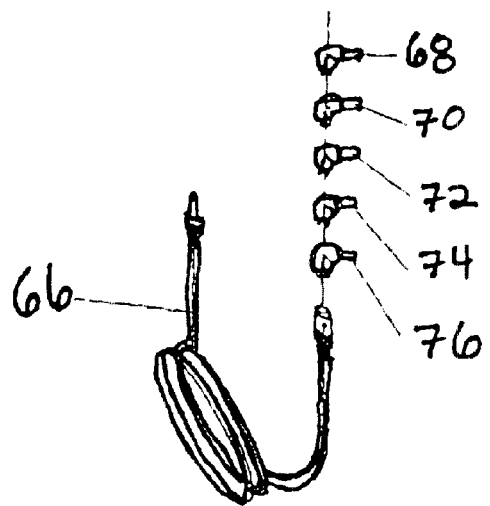
FIG. 7 is a top view of the DC output connector and multiple adaptors to be used in accordance of the embodiment of the present invention illustrated in FIG. 1.
Figure 8:
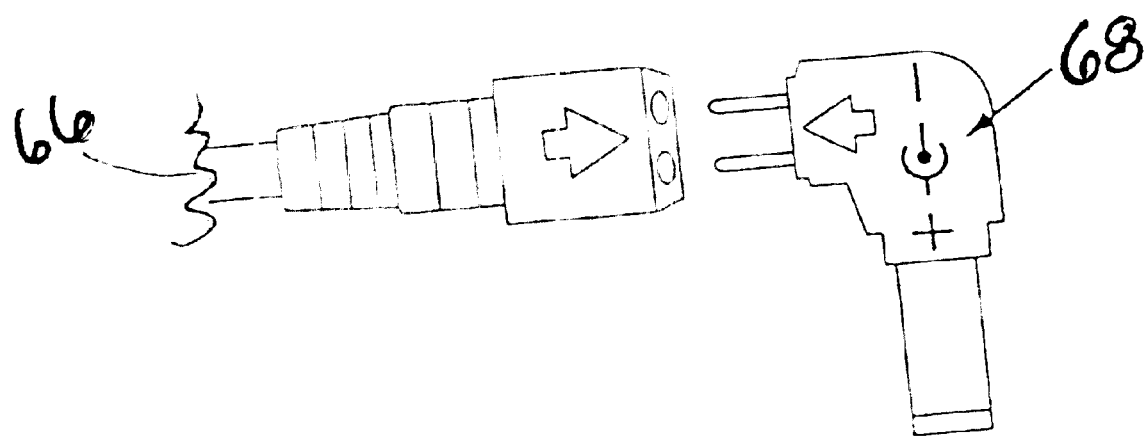
FIG. 8 is a magnified view of the DC output connector and an adaptor of FIG. 7, showing how the two parts connect.

Battery 58 is also electrically connected to twelve volt DC outlet 52 and three-way switch 20. A male to male power coupling car cord assembly 64 (FIG. 6) can be connected to twelve-volt D.C. outlet 52. Male to male car cord assembly 64 has on the outer surface of one of its ends a power indicator light 68. Also at the same end, a twenty-five amp fuse is housed within the connector 64. Additionally, twelve-volt outlet cover 54 is designed to snap onto and cover twelve-volt outlet assembly 52. Further, battery 58 is electrically connected to D.C. output switch 36 and D.C. output connector 38. A DC power converter cable 66 (FIG. 7) can be connected to D.C. output connector 38. D.C. converter cable 66 can be connected to multiple adapter plugs, which are of various dimensions to accommodate different jacks. In the preferred embodiment of the present intervention five adaptor plugs are supplied, specifically a 5.5 mm×2.5 mm plug 68, 5.5 mm×2.1 mm plug 70, 5 mm×2.5 mm plug 72, 3.5 mm×1.35 mm plug 74 and a 4.7 mm×1.7 mm plug 76. The adapter plugs are configured and dimensioned to plug into D.C. converter cable 66, as shown in FIG. 8.

When a user needs to charge a dead automobile battery using the inventive appliance 10, the user attaches car cord assembly 64 to D.C. twelve-volt outlet 52 at one end, and attaches the other end of car cord 64 to the automobile cigarette lighter. The user then moves three position switch 20 to the output position. Indicator light 68 will then light up indicating that appliance 10 is providing power to the automobile battery. Appliance 10 should be allowed to remain attached as described for a minimum of 35 minutes before the user attempts to start the car.

When a user chooses to use appliance 10 as a DC twelve-volt power source, for example to run a radar detector, portable search light, air compressor, portable CD player, or cell phone, the user can plug the device into D.C. twelve volt outlet 52, just as one would do normally into a cigarette lighter of an automobile.

Should the user decide to use the appliance 10 as a DC power source for a three to nine-volt device, the user should attach a DC power converter cable 66 to D.C. output connector 38. The user should attach the proper adapter plug and attach the appropriate adapter plugs to DC power output cable 66. The user selects the desired voltage on the D.C. output switch 36. The user then attaches the output plug to the device to be used. The user then puts three-way switch 20 into the output position. The desired device can now be used.

In the preferred embodiment of the present invention 10, when battery 58 is fully charged, the average cell phone will be provided with four hours of talk time and five days of standby mode, a camcorder with a 0.6 amp load will be provided with 2½ hours of use or a camcorder with a 0.4 amp load will be provided with 3.6 hours of use, a three watt CD player will be provided with five hours of use, a four watt dual fluorescent camping lantern will be provided with three and one half hours of use, or a twelve and one half watt spotlight will be provided with two hours of use.

To check the charge level of battery 58 of appliance 10, three-way switch 20 should be placed in a battery reader position. It is noted that the battery charge indicator lights 24 only work when switch 20 is placed in the battery reader position. This is done for the purpose of conserving charge. Once the switch has been put in the battery reader position, the charge level indicator lights 24 will indicate whether battery 58 has a full charge 30, half charge 28, or no charge 26.

Battery 58 of appliance 10 can be charged using the male to male adapter 64 or AC charger 62. To charge battery 58 with male to male adapter 64, the user need only attach car cord assembly 64 to twelve-volt outlet 52 at one end and attach the other end of car cord 64 to the automobile cigarette lighter while the engine of the car is running. The three-way switch 20 should be left in the center, off position. Battery 58 will have a full charge at thirty to sixty minutes. Once a full charge has been achieved, the user should remove appliance 10 from its connection to the automobile cigarette lighter.

To charge battery 58 with AC charger 62, the user should connect AC charger 62 to the electrical connector 56. AC charger 62 can then be plugged into any typical AC outlet and then battery 58 will be charged in thirty to sixty minutes. Once a full charge has been achieved the user should remove AC charger 62 from its connection to appliance 10.

As noted above, the invention is disclosed in the form of several embodiments. For the purposes of clarity of illustration, where possible and practical, similar part or parts performing a similar or identical function are labeled with numerals which differ by a multiple of 100 from similar or analogous parts in prior embodiments.

Figure 11:
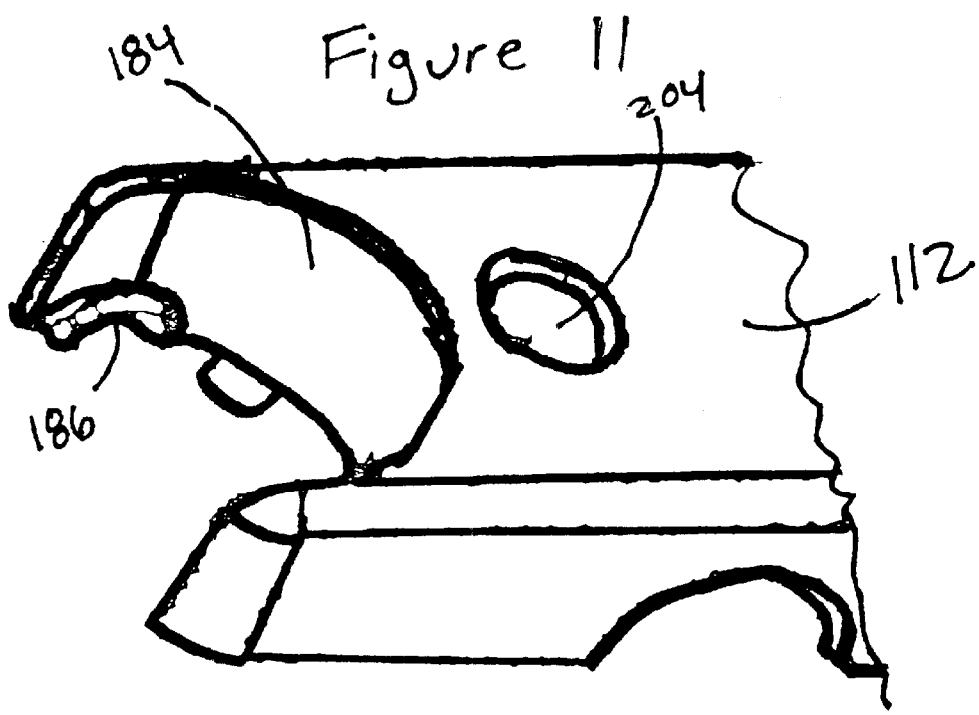
FIGS. 11 and 12 are magnified views showing the grooves and indentations of the embodiment of the present invention illustrated in FIG. 9.
Figure 12:
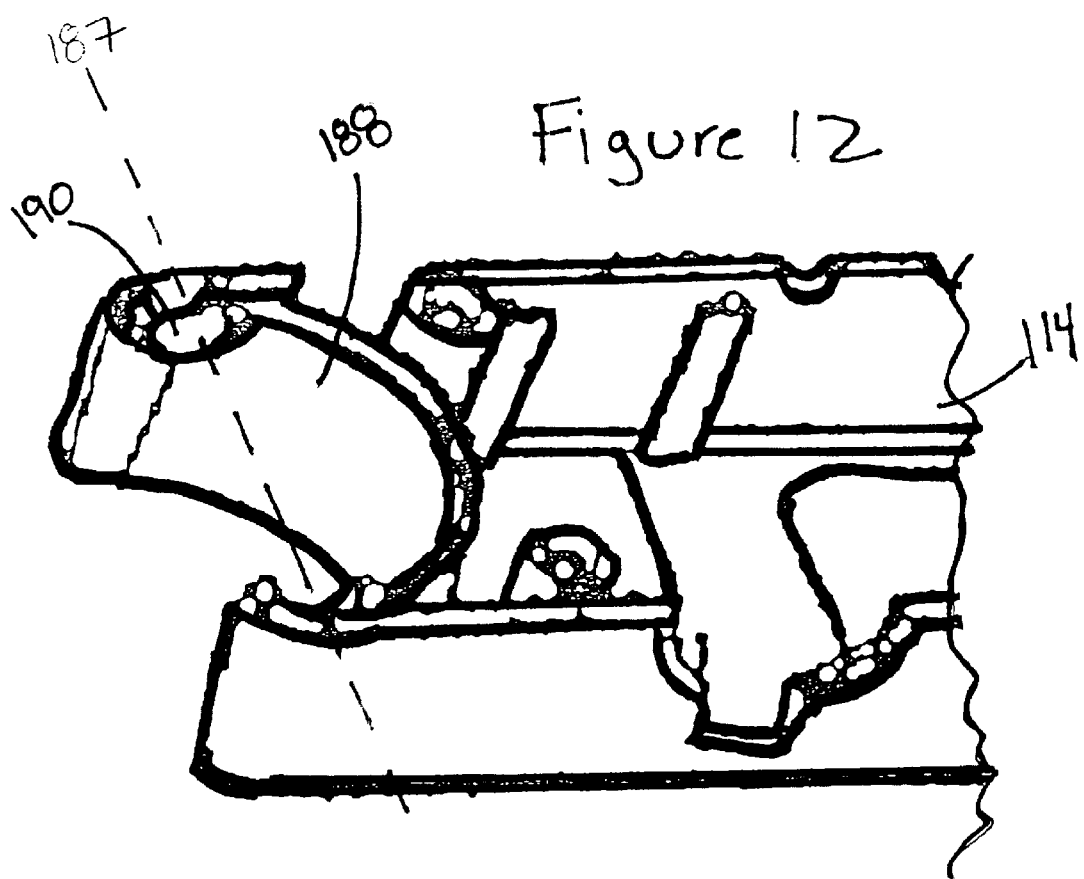

In an alternative embodiment of the present invention illustrated in FIGS. 9 through 12, power source 110 is similar to appliance 10 with the addition of a light 182, which performs a function of or providing illumination. At one end of top cover piece 112, is an indented section 184 which contains grooves 186 toward the end portion of cover 112. Bottom portion 114 contains a similar indented section 188 and grooves 190. When cover piece 112 is assembled upon bottom piece 114, indented sections 184 and 188, and grooves 186 and 190 combine to form the housing for light 182. Grooves 186 and 190 are disposed on two sides of the indentation such that the central axis 187 through the center of grooves 186 are in a straight line, as illustrated in FIGS. 11 and 12.

Light 182 is made up of a light body 192. In the preferred embodiment, light body 192 has an outside wall which is hemispheric in shape. Disposed on opposing surfaces of the outside wall of light body 192, aligned at 180 degrees are projections 194. Projection was 194 are surrounded by washer-like devices or roops 196. Within light body 192 is a light bulb 198. In the preferred embodiment light bulb 198 is a twelve-volt, three-watt type. Inserted within light body 192 is a light cup 199. Light cup 199 is a conical shaped element with the point of the cone removed. Light cup 199 is inserted into light body 192 in the direction of the point of the cone. The removed pointed area accommodates light bulb 198. Disposed on the open-end of the cone is a transparent, or translucent lens 200. Lens cover 202 is then attached to light body 192. Lens cover 202 holds lightbulb 198, light cup 199, and lens 200 in place within light body 192. In the preferred embodiment of the present invention, lens cover 202 is screwed onto the flattened portion of the hemisphere of light body 192.

Projection 194, surrounded by washer-like devices or roops 196 are inserted into grooves 186 and 190. This configuration allows light 182 to rotate into directions indicated by arrows 203 at a minimum of 180 degrees, being directed from the direction of the top surface to the direction of the bottom surface, and all points in between directed away from power sources 210.

Light 182 can have a battery contained within light body 192, or be connected to a battery that is disposed within the main housing that is specific to light 182. In the preferred embodiment of the present invention, light 182 is electrically connected to light switch 204 which is electrically connected to battery 158. Light switch 204 can be any type of standard light switch such as a toggle switch, a slide switch, or as in the preferred embodiment a push-on push-off switch. In an alternative embodiment of the present invention, lights switch 204 can be a three-way switch, with an on setting, an off setting and a flashing setting.

Figure 13:
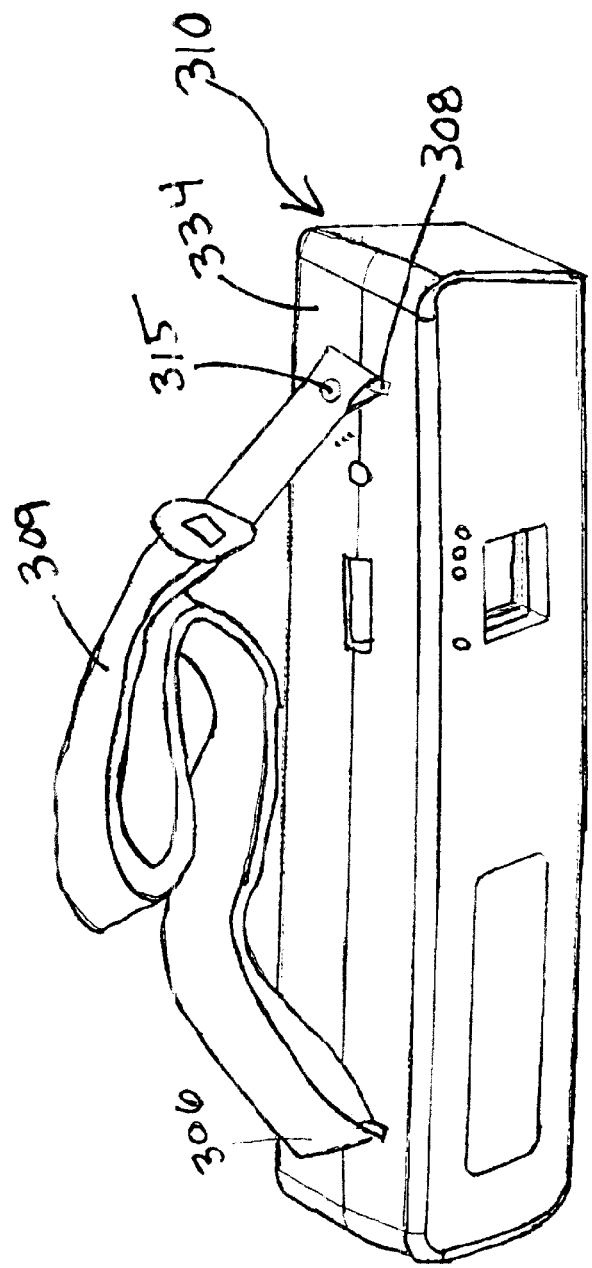
FIG. 13 is a front perspective view of an alternative embodiment of the present invention, similar to the embodiment illustrated in FIG. 1, with the addition of a strap member.
Figure 14:
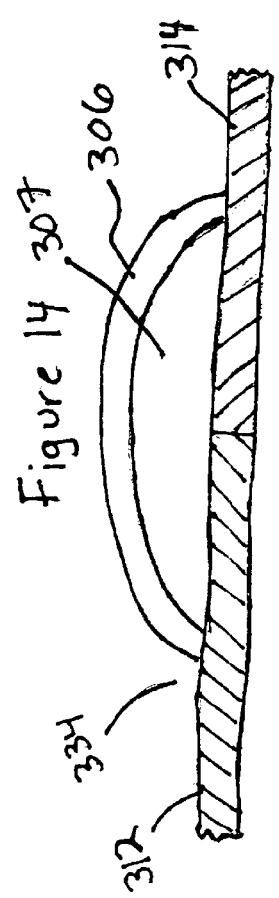
FIG. 14 is a magnified view of the support member for the strap of the embodiment illustrated in FIG. 13.

In an alternative embodiment of the present invention, illustrated in FIG. 13, power source 310 is similar to appliance 10, with the addition of a strap 309. On front surfaces 334, are two projections 306 and 308 for attachment of a strap 309 to the outer housing of power source 310. Loop projections 306 and 308 are each attached to the outer housing at two points and each defines a void 307 for one end of strap 309 to be placed through, as is illustrated in FIG. 14.

Strap 309 can be of any length, and be adjustable or non-adjustable. In the preferred embodiment of the present invention, strap 309 is approximately 1.25 meters in length. Strap 309 is secured to projection 306 and then threaded through projection 308 attaching to a buckle 311 on strap 309. This configuration allows a user to adjust the length of strap 309 by moving the buckle 311 away from projection 308 to shorten strap 309 or towards projection 308 to lengthen strap 309.

At one end, strap 309 is attached to its respective loop projection 308 by being looped around projection 308 and secured to itself by a rivet 315.

Strap 309 allows the user to make use of power source 310, while leaving his hands free. For example, if the user has a searchlight plug into twelve-volt outlet 352, the user has two free hands to direct the searchlight and search.

Figure 15:
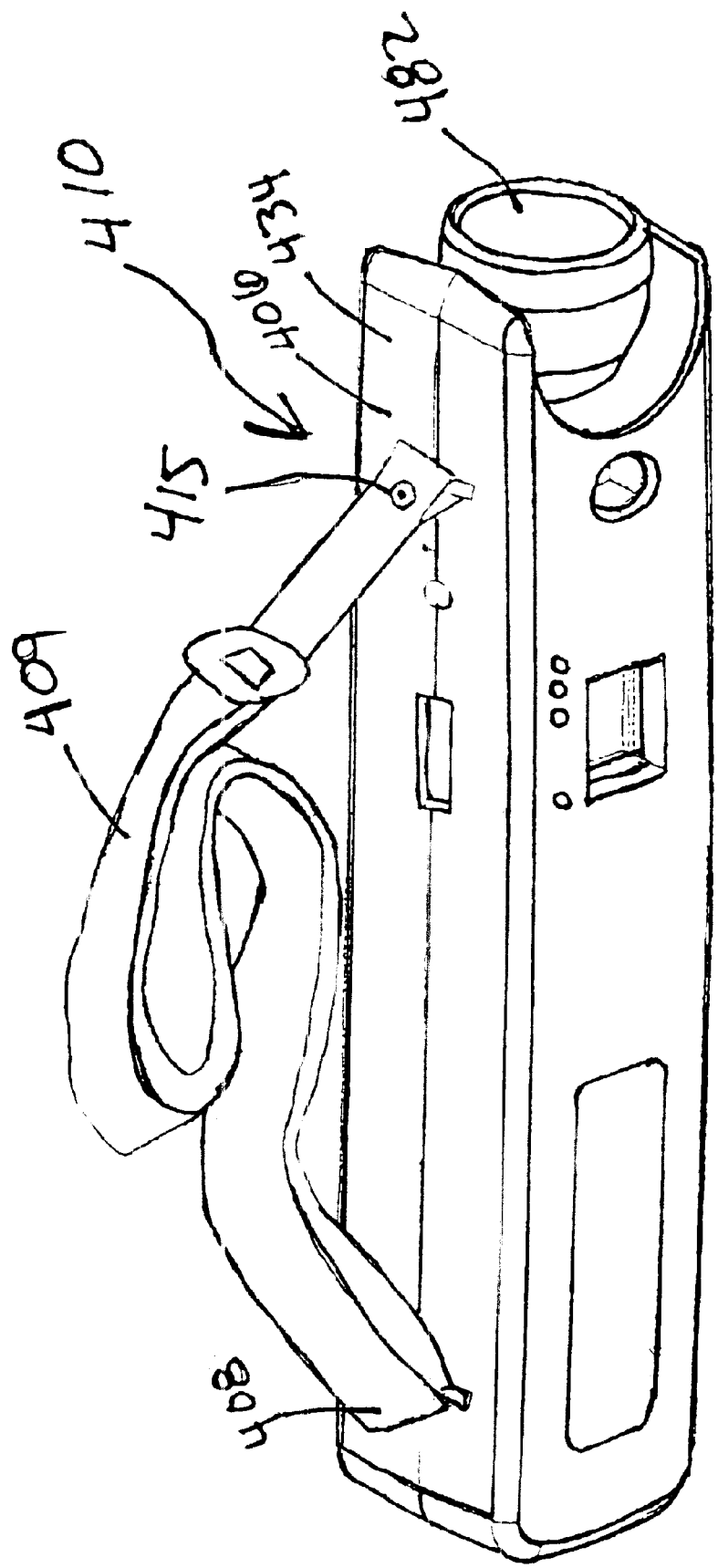
FIG. 15 is a front perspective view of an alternative embodiment of the present invention, similar to the embodiment illustrated in FIG. 9, with the addition of a strap member.

In the alternative embodiments of the present invention, illustrated in FIG. 15, power source 410 is similar to power source 310, with the addition of a light, similar to power source 110. On front surfaces 434, are two projections 406 and 408 for attachment of a strap 309 to the outer housing of power source 410. Projections 406 and 408 are each attached to the outer housing at two points leaving a space for strap 409 to be placed through.

Strap 409 can be of any length, and be adjustable or non-adjustable. In the preferred embodiment of the present invention, strap 409 is approximately 1.25 meters in length. Strap 409 is secured to projection 406, by rivet 415 and then threaded through projection 408 attaching to a buckle 411 on strap 409. This configuration allows a user to adjust the length of strap 409 by moving buckle 411 away from projection 408 to shorten strap 409 or towards projection 408 to lengthen strap 409.

When strap 409 is used with the embodiment of the present invention with a built-in light 482, the strap provides the user with a means to hold a light 482 while keeping both hands free.

The construction of the embodiment illustrated in FIG. 15 is of particular value in connection with hands-free operation of the device. In particular, the point of origination of the light can be kept steady without use of the hands by the light being hung from the shoulder of a user. The strap length of the strap may be adjusted in order to vary the height of the point of origination of light. Likewise, the strap can be slid on the shoulder of the user in order to vary the pitch of the light, in other words in order to vary the angle at which the light directs its output with respect to the ground. At the same time, the yaw may be adjusted by rotating the light in the plane substantially or most nearly parallel to the plane of the ground. Accordingly, by varying the strap length, the point of origination of the light is varied; by varying the position of the strap by sliding it, the up and down angular orientation of light emanating from the device is varied; and finally by varying the rotation angle of light housing 482, the horizontal angle can be varied, thus providing substantially complete freedom with respect to orientation of the light while at the same time providing stability and hands-free operation.

Figure 9:
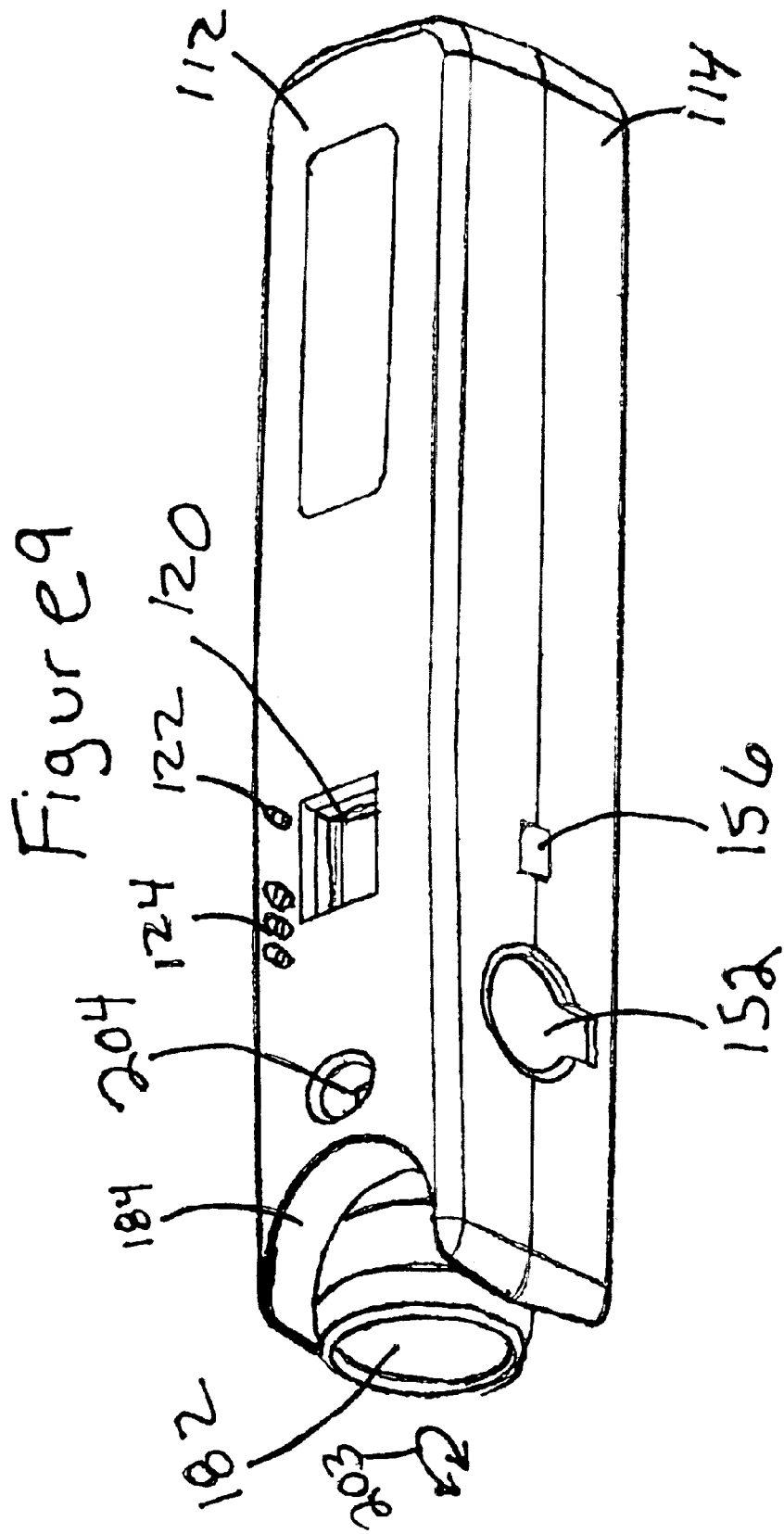
FIG. 9 is a top perspective view an alternative embodiment of the present invention, with the addition of a movable light.
Figure 10:
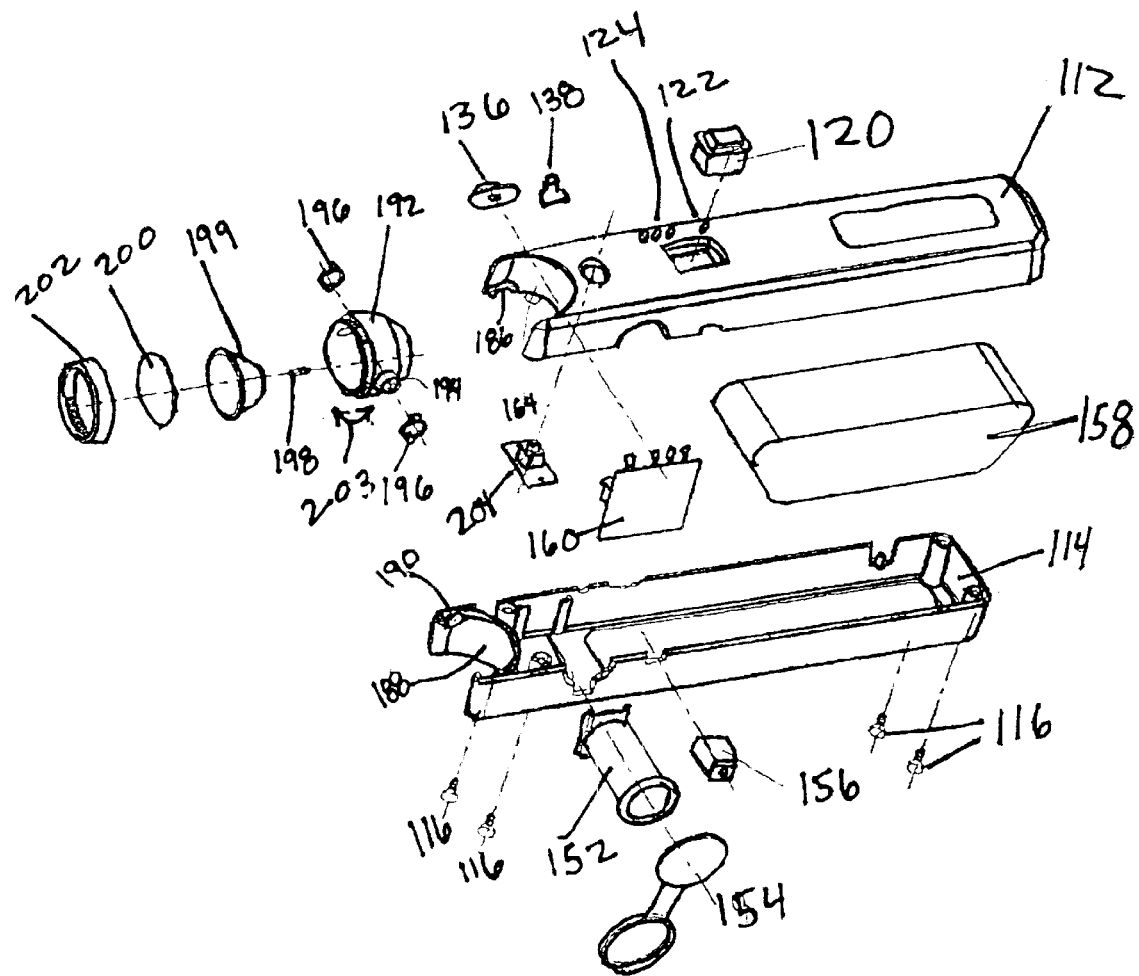
FIG. 10 is an exploded view of the embodiment of the present invention illustrated in FIG. 9.
Figure 16:
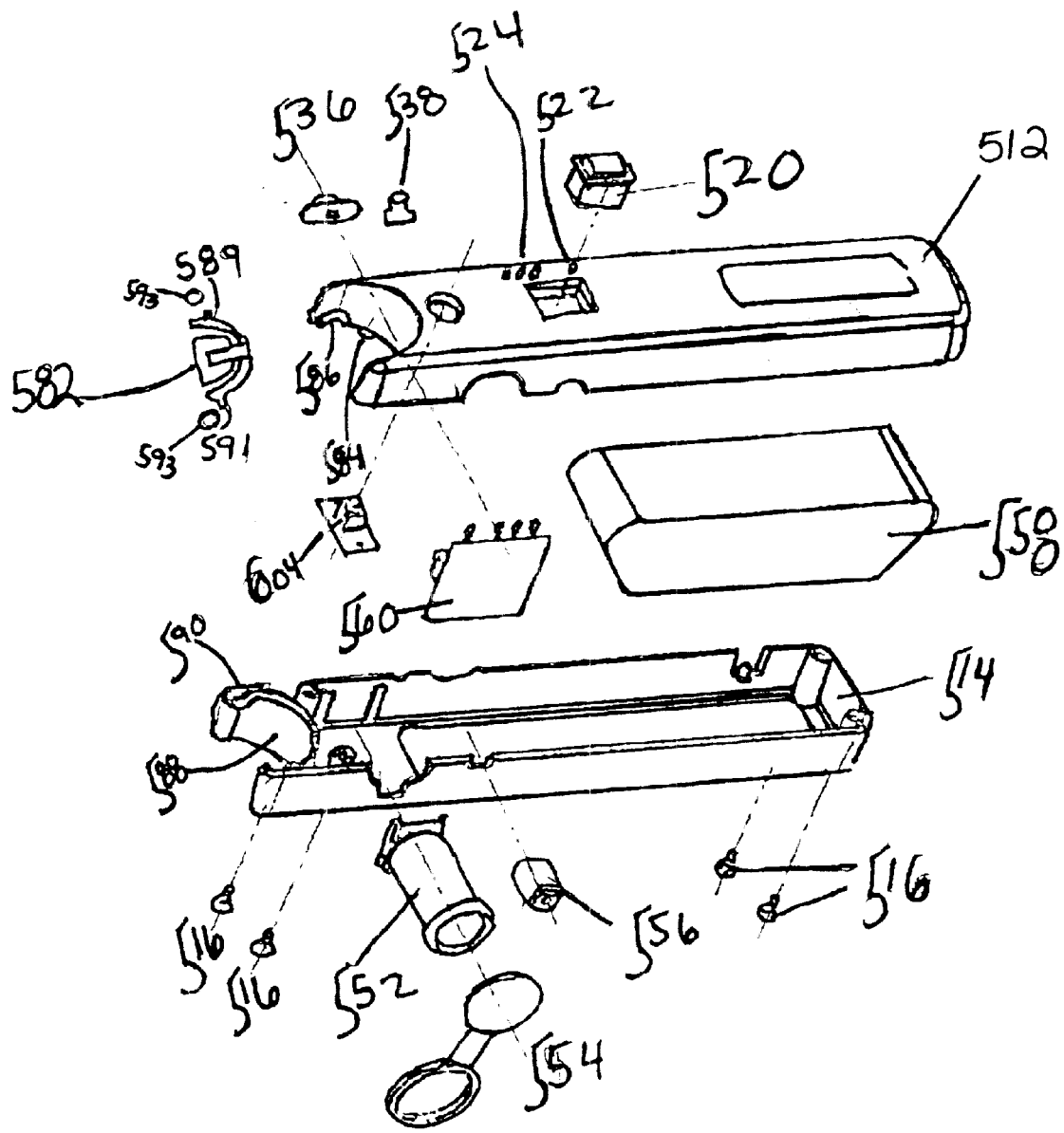
FIG. 16 is an exploded view of the embodiment of the present invention similar to the embodiment illustrated in FIG. 9 except the light is capable of motion in two planes.
Figure 17:
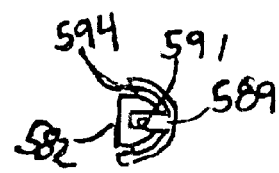
FIG. 17 is a side view of the light and motion coupler of the embodiment illustrated in FIG. 16.

An alternative embodiment of the power source 510 is illustrated in FIG. 16, which is similar to the embodiment illustrated in FIG. 9, with the exception that the light rotates in two planes. Projections 594 of light 582 and roops 596 are inserted into grooves 587 of motion coupling device 589 as illustrated in FIG. 17. Coupling device 589 has projections 591 disposed in a plane perpendicular to grooves 587. Projections 591 surrounded by roops 593 are inserted into grooves 586 and 590 of the main housing.

The alternative embodiment of FIG. 18 is similar to the embodiment illustrated in FIG. 9 with a goose-neck connection 789 between the main body and the light 782. Goose-neck connector is attached to the hemispheric surface of light 782 at one end, and attached to the main housing at groove 789 of top housing member 712 and groove 790 of bottom housing 714.

While illustrative embodiments of the invention has been described, it is, of course, understood that various modifications of the invention will be obvious to those of ordinary skill in the art. Such modifications are within the spirit and scope of the invention which is limited and defined by the appended claims.

What is claimed is:

1. An automobile appliance, comprising:
   (a) a rechargeable battery for receiving power from a recharging source and for storing said power from said recharging source, said rechargeable battery having terminals for receiving electrical power and for outputting power stored in said rechargeable battery;
   (b) an electrical circuit coupled to said rechargeable battery and having a first connector configured to couple power from said rechargeable battery to an external device and to transmit power from said recharging source to said terminals of said rechargeable battery to recharge said rechargeable battery;
   (c) a strap long enough to extend around the shoulder of a user and hang below said shoulder, said strap having first and second ends, said first end of said strap being secured at a first point on said housing, and said second end of said strap being secured to a second point on said housing, said first point being displaced from said second point; and
   (d) a light source mounted on said appliance;
   wherein said light is rotatably mounted on said appliance;
   wherein said strap extends upwardly from said appliance and said light is rotatably mounted to rotate to the left and right of a user when said appliance is hanging from the shoulder of a user;
   wherein said strap is adjustable in length to adjust the height of the point of origination of light output by said light source;
   wherein said electrical circuit further comprises a switch for selecting different voltages for powering said external device;
   wherein said electrical circuit further comprises a selector switch, said selector switch having an on setting, an off setting and a flashing setting to turn said light source on, off, and intermittently on, respectively.

2. A portable, rechargeable, hands-free, light-bearing appliance comprising:
   (a) an elongated housing having a direction of elongation;
   (b) accommodated in the housing, a rechargeable battery for storing power from a recharging source, the rechargeable battery having input output terminals for receiving electrical power from the recharging source and output terminals for outputting stored power;
   (c) an electrical circuit coupled to the rechargeable battery and having a first connector configured to couple power from the rechargeable battery to an external device and to transmit power from the recharging source to the rechargeable battery input terminals;
   (d) a light source pivotably mounted at one end of the elongated housing to project a light beam in the direction of elongation wherein the light source is pivotable about an axis transverse to the direction of elongation to project the light beam at an angle to the direction of elongation;
   (e) a shoulder strap having first and second ends secured to the housing at respective first and second secural points on the housing, the secural points being spaced apart along the housing in the direction of elongation, the strap being of sufficient length to extend around a user's shoulder and hang the power supply below the shoulder;
   wherein the power supply can be supported by the shoulder strap from the user's shoulder for hands-free use of the light to project a light beam forwardly of the user.

3. An appliance as claimed in claim 2 wherein said external device is an automobile and the appliance further comprises a coupler cable having first and second ends, said first end configured to mate with said first connector and said second end configured to mate with a cigarette lighter connector on said automobile.

4. An appliance as claimed in claim 3, wherein said electrical circuit further comprises a second connector adapted to receive an ac charging device.

5. An appliance as claimed in claim 4 wherein said electrical circuit further comprises a switch for selecting different voltages for powering said external device the voltages optionally comprising one, two or three voltages selected from the group consisting of 3, 6 and 9 volts.

6. An appliance as claimed in claim 5 wherein the rechargeable battery can supply sufficient energy to start an automobile and the appliance includes a coupler for connecting to an automobile cigarette lighter outlet to supply the starting energy to a discharged automobile battery via a cigarette lighter outlet recessed into the appliance housing.

7. An appliance as claimed in claim 2 wherein said strap is adjustable in length to adjust the height of the point of origination of light output by said light source.

8. An appliance as claimed in claim 7, wherein said rechargeable battery is a nickel cadmium or metal hydride battery.

9. An appliance as claimed in claim 7, wherein said electrical circuit further comprises an indicator device indicating the level of charge of said rechargeable battery.

10. An appliance as claimed in claim 7, wherein said electrical circuit further comprises a switch for selecting different voltages for powering said external device the voltages optionally comprising one, two or three voltages selected from the group consisting of 3, 6 and 9 volts.

11. An appliance as claimed in claim 2 wherein said light is mounted on a gooseneck.

12. An appliance as claimed in claim 2 wherein said light is mounted on a universally angularly deflectable neck.

13. An appliance as claimed in claim 2 wherein said electrical circuit further comprises a selector switch, said selector switch having an on setting, an off setting and a flashing to turn said light source on, off, and intermittently on, respectively.

14. An appliance as claimed in claim 2 wherein the user can preset the orientation of the light prior to hands-free use by pivoting the light source about the transverse axis to a desired side-to-side angle of projection of the light beam and can slide the strap on the shoulder to adjust the angle of projection of the light beam in a vertical plane.

15. An appliance as claimed in claim 2 wherein the shoulder strap is adjustable in length to adjust the height of the point of origination of light output by said light source.

16. An appliance as claimed in claim 2 wherein the elongated housing is box-like and can be conveniently gripped and held in one hand.

17. An appliance as claimed in claim 16 wherein the rechargeable battery can supply sufficient energy to start an automobile and the appliance includes a coupler for connecting to an automobile cigarette lighter outlet to supply the starting energy to a discharged automobile battery via a cigarette lighter outlet recessed into the appliance housing.

18. An appliance as claimed in claim 2 wherein the rechargeable battery can supply sufficient energy to start an automobile, the appliance optionally including a connector for an automobile cigarette lighter outlet to supply the starting energy to a discharged automobile battery.

19. An appliance as claimed in claim 2 comprising a selection of multiple DC connectors for connecting to an external device.

20. An appliance as claimed in claim 2 wherein the light source is mounted for universal angular deflection.

21. A portable, rechargeable, power supply for automotive use comprising:
   (a) a housing;
   (b) accommodated in the housing, a rechargeable battery for storing power from a recharging source, the rechargeable battery having input output terminals for receiving electrical power from the recharging source and output terminals for outputting stored power wherein the rechargeable battery can store and supply sufficient charge energy to start an automobile;
   (c) an electrical circuit coupled to the rechargeable battery and having a first connector configured to couple power from the rechargeable battery to an external device and to transmit power from the recharging source to the rechargeable battery input terminals, wherein said electrical circuit further comprises a second connector adapted to receive an AC charging device wherein said electrical circuit further comprises multiple different DC voltage outputs and a switch for selecting a suitable DC voltage for powering said external device;
   (d) cigarette lighter outlet connector to supply the starting energy to a discharged automobile battery.

22. A power supply according to claim 21 wherein the power supply comprises a cigarette lighter outlet recessed into the appliance housing, said recessed cigarette lighter outlet being useful to power an external device, and the cigarette lighter outlet connector comprises a coupler having first and second male ends to mate with and couple between the recessed appliance cigarette lighter outlet and an automobile cigarette lighter outlet.

23. A power supply according to claim 21 wherein said rechargeable battery is a nickel cadmium or metal hydride battery and the housing has a compact elongated box-like shape and can be gripped and held in one hand.

24. A power supply according to claim 21 wherein the DC output voltages comprise one, two or three voltages selected from the group consisting of 3, 6 and 9 volts.

* * * * *